Nov. 2, 1954          O. W. DILLON          2,693,063
BEVEL EDGING MACHINE AND METHOD
Filed Aug. 13, 1949                    2 Sheets-Sheet 1
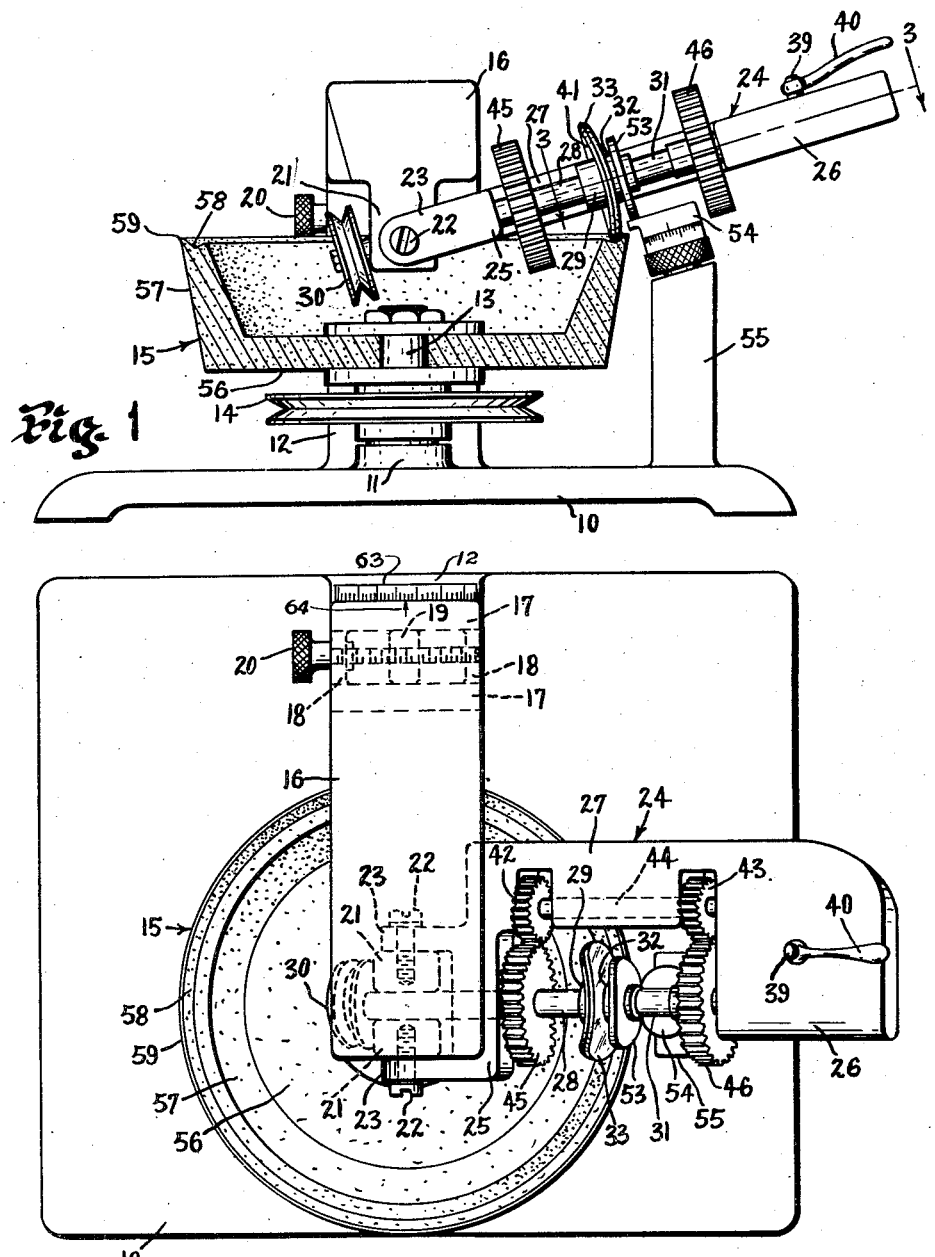
INVENTOR
OSCAR W. DILLON Nov. 2, 1954

O. W. DILLON 2,693,063

BEVEL EDGING MACHINE AND METHOD

Filed Aug. 13, 1949

INVENTOR
OSCAR W. DILLON

BY
Louis L. Gagnon
ATTORNEY 2,693,063

Patented Nov. 2, 1954

2,693,063

BEVEL EDGING MACHINE AND METHOD

Oscar W. Dillon, Sturbridge, Mass., assignor to American Optical Company, Southbridge, Mass., a voluntary association of Massachusetts Application August 13, 1949, Serial No. 110,215

9 Claims. (Cl. 51—127)

This invention relates to improvements in edge grinding machines and has particular reference to novel means and method of forming beveled edges on articles such as ophthalmic lenses.

One of the principal objects of the invention is to provide a bevel edging machine for beveling the edge of a meniscus shaped article of odd contour shape such as a lens wherein the effective abrading portion of the abrading means for forming the beveled edge on said lens is provided with a V-shaped groove curved in the direction of the meniscus shape of the lens about a center of curvature substantially equal to the radius of curvature of the base curve or of a curve intermediate said base curve and the prescriptive curve of the lens whereby the edge of said lens at different locations of engagement thereof with the V-shaped groove during the rotation of said lens will be substantially along the line of the arc of the curvature of said V-shaped groove.

Another object is to provide a bevel edging machine of the above character wherein the so-called error of reach present with most prior machines of this nature, when edging meniscus shaped articles of non-circular contour, has been eliminated.

Another object of the invention is to provide improved means and method of forming beveled edges on articles such as ophthalmic lenses and embodying a machine which is provided with an abrading element rotatable about an axis and having a groove therein encircling said axis and spaced therefrom an amount substantially equal to the radius of curvature of the base curve of the lens to be edged or about a curvature intermediate that of the base curve and the prescriptive curve of the lens, and means for carrying the lens for rotary movement thereof about a second axis at an angle to the first axis and for arcuate movement about a third axis substantially normal to the axis of rotation of the abrading wheel.

Another object is to provide means and method of the above character embodying a machine which is provided with an abrading element rotatable about an axis and having a groove therein encircling said axis and spaced therefrom an amount substantially the same as the radius of the base curve or a curve intermediate said base curve and the prescriptive curve of the lens to be edged, and means for supporting the lens for rotary movement thereof about a second axis at an angle to the first axis and for arcuate movement about a third axis substantially normal to the axis of rotation of the abrading wheel, said third axis lying substantially in a plane defined by the base of said groove and further lying substantially along a line radial with said first axis and intersecting the second axis about which the lens is rotated.

Another object is to provide means and method of the above character embodying a rotatable bowl-shaped grinding element having a V-shaped groove formed in the edge face of its rim and shaped to provide the desired bevel on the edge of an ophthalmic lens engaged thereby, with said groove being disposed in said rim at a predetermined radius from the axis of rotation of said element, said radius being substantially the same as the radius of the base curve or a curve intermediate said base curve and the prescriptive curve of the lens being edged.

Another object is to provide means and method of the above character embodying a rotatable grinding element having a circular groove therein, means for adjustably carrying a lens to be edged for arcuate movement toward and away from said groove on a radius substantially the same as the radius of the base curve or a curve intermediate said base curve and the prescriptive curve of the lens, and means for revolving the lens during the edging operation to present uncut portions of the lens edge to the groove for forming a beveled edge thereon with the contour shape of the resultant lens being in accordance with the shape of a pattern carried adjacent to and rotatable with said lens.

Another object is to provide an automatic machine of the above character for forming beveled edges on articles such as ophthalmic lenses, which machine is relatively simple in its construction and operation, efficient, and comparatively economical to manufacture.

Other objects and advantages of the invention will become apparent from the following description taken in connection with the accompanying drawings, in which:

Fig. 1 is a front elevational view of a machine embodying the invention with the abrading wheel being shown in section;

Fig. 2 is a top plan view of the machine shown in Fig. 1;

Figure 3:
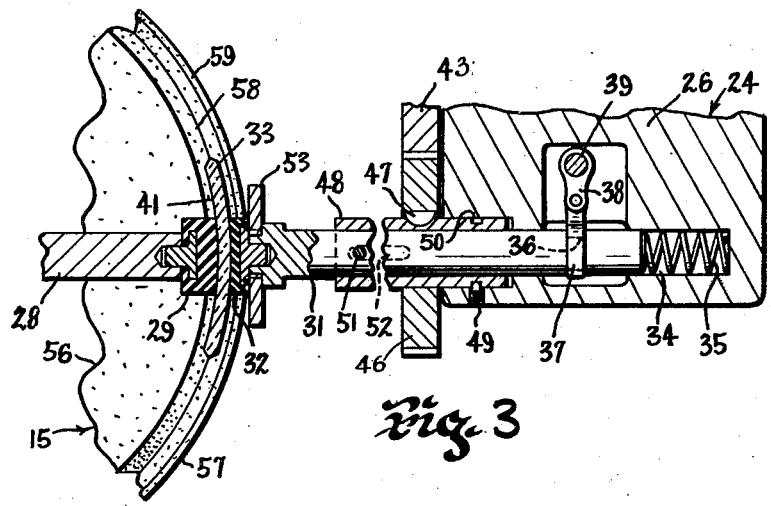
Fig. 3 is a fragmentary top plan view partly in section of the lens carrying means and grinding element.

In proving irregularly shaped articles such as ophthalmic lenses having curved front and rear surfaces with beveled edges by most prior art methods and with most prior art devices, great difficulty has been encountered in forming a uniform bevel throughout the contour of the lenses and more particularly a bevel which is substantially centrally located peripherally of the lenses or at predetermined distances from a side surface thereof such as is required to permit the lenses to be easily and accurately assembled with rim members without requiring undue bending, twisting, reshaping or other distorting of the rims. This difficulty is due to the fact that the lens is usually rotated about an axis passing substantially through its geometric center and is moved into and out of engagement with the abrading tool in a direction substantially perpendicular to the axis of rotation of the tool. As a result such a lens will be provided with an irregular bevel along its periphery and attempts to secure a rim member, such as a narrow eye wire or the like over the beveled edge, usually results in uneven disposition of the rim on the lens with consequent introduction of strain and detraction from the neat appearance desired of an ophthalmic mounting of which such rimmed lenses form a part.

Another disadvantage resides in the fact that with most prior art devices the abrading wheels are formed with their effective abrading surfaces disposed in a plane substantially perpendicular to the axis of rotation of the lens, with said lens being moved substantially perpendicularly into and out of engagement with the abrading surface whereby lenses of all contour shapes cannot be satisfactorily bevel edged. Such devices have the disadvantage known as "error of reach" wherein an edge portion having a long radius will not engage the V-groove of the abrading wheel in the same manner as an edge portion having a short radius. In such cases it is evident that meniscus shaped lenses will be provided with an uneven or crooked bevel at different locations throughout their periphery.

The present invention overcomes the above disadvantages by providing means for supporting a lens for movement arcuately into and out of abrading position along an arc which is substantially the radius of the base curve of the lens, and by providing an abrading wheel of novel cupped shaped rotatable about an axis perpendicular to the axis of the arcuate movement of the lens. The abrading wheel is provided peripherally with a circular V-shaped groove at a distance from its axis of rotation substantially equal to the radius of the base curve of the lens whereby the groove will curve in the direction of curvature of the lens. Therefore, when the lens is being edged its arcuate movement plus the curvature of the groove will cause the periphery of the lens, regardless of its contour shape, to uniformly engage in the groove and cause said periphery to be evenly beveled in accordance with the shape of the groove, and will thus overcome the unevenness of the bevel which resulted where "error of reach" is encountered.

Referring more particularly to the drawings wherein like characters of reference designate like parts throughout the several views, the present invention is embodied in a machine such as disclosed by the drawings wherein there is provided a base 10 having a pair of spaced supports 11 and 12 thereon. The support 11 has one end of an upright shaft 13 rotatably mounted therein, said shaft 13 fixedly carrying a pulley 14 midway thereof and having an abrading wheel 15 secured for rotation therewith adjacent its free end. It is to be understood here that any suitable conventional power mechanism may be employed to rotate the abrading wheel 15 about its axis, such as by providing an electric motor connected to the pulley 14 by a belt or similar driving connection.

The other support 12 has one end of a supporting arm 16 adjustably connected thereto, the arm 16 being adapted to extend above the abrading wheel 15. The adjustable connection means comprises a cross slide embodying a track 17 on the upper surface of the support 12 with one or more lugs 18 formed adjacent said track and having openings therein, and a track on the under side of the supporting member 16 for sliding engagement with the track 17, with a lug 19 depending from the member 16 and having a threaded opening therein concentric with the openings in lugs 18, and further providing a threaded adjusting screw 20 in the concentric openings so that upon rotation it will cause the entire supporting member 16 to be adjusted longitudinally of the cross slide in a direction transversely of the machine. A suitable scale 63 and indicator 64 may be provided on the support 12 and member 16, if desired, to indicate the extent of adjustment.

A pair of spaced downwardly extending lugs 21 are provided adjacent the forward free end of the member 16 and have pivotally secured thereto, as by studs 22, a pair of spaced lugs 23 formed integral with and extending outwardly of one end of a lens supporting member 24. The studs 22 are coaxial so that the member 24 is pivoted to move vertically about the axis of the studs 22 and is angularly disposed with respect to the longitudinal axis of shaft 13. The major portion of the lens supporting member 24 is substantially U-shaped with the lugs 23 extending from one arm portion 25 thereof, the other arm portion 26 being connected to the portion 25 by a bight portion 27 as indicated in Fig. 2.

A shaft 28 is rotatably supported in the arm portion 25 of the member 24 and is of such length as to have one end extending between and beyond the lugs 21 on the member 16 and to have its other end extending into the space between the two arm portions 25 and 26. A lens engaging pad 29 having a facing of resilient material is secured by suitable means to the end of the shaft 28 extending into the space between the arms 25 and 26 and a pulley 30 is fixedly secured to the other end of the shaft 28.

A second shaft 31, in axial alignment with shaft 28, is rotatably mounted in the arm 26 and the end thereof toward the shaft 28 is provided with a lens engaging pad 32 of a type similar to the pad 29 on shaft 28. The pads 29 and 32 can be spaced sufficiently to permit a lens 33 to be inserted therebetween for clamping since the shaft 31 is mounted for longitudinal sliding movement in the arm portion 26 upon operation of suitable mechanism therefor such as is illustrated in Fig. 3 wherein the arm portion 26 of the member 24 is provided with a bore 34 in which the shaft 31 is movably mounted. The end of the shaft 31 within the bore 34 is spaced from the end of the bore by a coiled tension spring 35 and is provided with a groove 36 therearound in the portion located within the arm portion 26, the groove 36 having a yoke 37 disposed therein. The yoke 37 is mounted so as to be permitted free movement in the groove 36 in a direction perpendicular to the longitudinal axis of the shaft 31 but with substantially no movement in the groove in a direction longitudinally of the shaft. A link 38 is pivotally connected to the yoke 37 and is fixedly secured to the shaft 39 rotatably carried by the arm portion 26 and extending outwardly thereof. The outer end of the shaft 39 has a handle 40 connected thereto (Figs. 1 and 2) so that by manual manipulation of the handle 40 the link 38 and yoke 37 will move the shaft 31 inwardly of the bore 34 against the tension of the spring 35. This will space the pads 29 and 32 sufficiently to permit a lens 33 to be inserted therebetween. Upon release of the handle 40 the spring 35 will urge the shaft 31 toward shaft 28 and cause the pads 29 and 32 to firmly contact the opposed side surfaces of the lens 33.

In positioning a lens 33 in the lens supporting member 24 it is important that the lens be placed so that its geometrical or other predetermined center is located substantially concentric with the shafts 28 and 31 and that the axes of the lens are also properly located. Also, for reasons to be clarified hereinafter, the concave or rear surface 41 of the lens which has been provided with the base curvature should be directed toward the shaft 28.

It is also important to note that the distance between the lens surface 41 and the center of the studs 22 should be substantially the same as the radius of the base curve of the lens. Therefore, when the supporting member 24 is swung about the axis defined by the centers of the studs 22 the lens 33 will be moved arcuately with its surface 41 constantly spaced from said axis a distance substantially equal to the radius of the base curve of the lens.

Suitable mechanism can be employed to rotate the lens 33 about its center during an edging operation, which mechanism can control such rotation through means such as a belt or similar device attached to the pulley 30. Upon rotation of the pulley 30 the shaft 28 will consequently be similarly rotated. Gears 42 and 43 are fixedly secured to a rotatable shaft 44 carried by the bight portion 27 of the member 24 and are adapted to mesh with gears 45 and 46 respectively secured to the shafts 28 and 31. Thus, upon rotation of shaft 28 the train of gears will cause shaft 31 to be similarly rotated. This mechanism, therefore, will cause the lens 33 to be rotated as desired in accordance with the particular control mechanism used.

The gear 46 is keyed at 47 to a tubular retainer 48 mounted over a portion of the shaft 31 (Fig. 3). The shaft 31 is adapted to slide longitudinally in the retainer 48, with the retainer, however, being prevented from longitudinal movement by a short stud 49 threadedly secured in the arm portion 26 and extending into a groove 50 formed around the retainer 48. Thus, the gear wheel 46 can rotate the retainer 48 which, through a pin 51 in the shaft 31 which extends into a slot 52 in the retainer 48, will cause the shaft 31 to be simultaneously rotated. By this means, since the retainer is restrained from movement longitudinally of the shaft 31, the gear 46 will be constantly maintained in meshed relation with gear 43 regardless of the position of shaft 31 with respect to shaft 28.

A pattern or former 53 is carried by the shaft 31 adjacent the lens 33 and can be mounted thereon in any suitable manner for rotation with the lens 33. The lower edge of the pattern 53 indicative of the edge of the lens being abraded is adapted, during an abrading operation, to rest upon a contact shoe 54 adjustably mounted in the upper end of an upright 55 carried by the base 10. The contact shoe 54 may be supported by any suitable adjustable means, such as a micrometer adjusting device, so as to control the size of the lens being edged, with the contour shape of the pattern 53, however, controlling the resultant contour shape of the lens. Thus, when the shaft 31, lens 33 and pattern 53 are rotated the entire lens supporting mechanism will be made to move about the axis of the studs 22 in edging irregularly shaped lenses and will cause the lens to receive a contour shape in accordance with the peripheral shape of the pattern 53.

The abrading wheel 15 is substantially bowl-shaped to provide a base portion 56 and an encircling ring-like side portion 57. A circular groove 58 is provided in the upper peripheral edge or rim 59 of the wheel 15 and is adapted to be engaged by the edge of the lens 33, the groove 58 being suitably shaped so that upon engagement by the edge of the lens during an abrading operation said edge will be provided with the desired bevel. Therefore, it is important that the apex of the groove 58 be disposed at a distance from the axis of rotation of the abrading wheel 15 substantially equal to the radius of the base curve or to a curve intermediate the base curve and the prescriptive curve of the lens 33. This will insure a more uniform and constant engagement of the edge of the lens 33 with the groove 58 during rotation of the abrading wheel 15. Since an abrading wheel is of a bowl shape parts of the lens supporting mechanism 24 can be conveniently positioned within the bowl as illustrated in Fig. 1, without interference with other parts of the machine.

It is also important to note that the axis of rotation of the lens supporting member 24, that is, the centers of the studs 22, are preferably disposed in a plane defined by the apex of the groove 58.

Thus, to specifically define the relative positions of certain operative parts of the machine with respect to other operative parts, it can be stated that the abrading element 15 is rotatable about an axis and has a circular groove 58 formed in its effective surface, which groove is substantially of the shape desired of the bevel on the resultant lens 33 and encircles the axis of the abrading element 15 at a radius substantially the same as or slightly greater than the base curve of the lens 33. The lens supporting member 24 is swingable about an axis substantially perpendicular to the axis of rotation of the abrading wheel, the said perpendicular axis lying substantially in the plane defined by the apex of the groove and said axis of rotation of the lens intersecting said axis of rotation of the wheel in said plane.

It is important in the present construction that the lens 33 be carried for movement about an axis on a radius substantially equal to the radius of the base curve of the lens as described above. That is, the distance from the surface 41 of lens 33 to the centers of the concentric studs 22 should be substantially the same as the radius of the base curve of the lens. This distance, however, may be varied slightly and within workable limits, depending of course upon the overall curvature of the lens and location at which the bevel is to be formed intermediate the base curve and prescriptive curve of the lens.

In forming a beveled edge on an irregularly shaped lens 33, a pattern 53 of the desired shape is placed in position on the shaft 31 and the size adjustment made by adjusting the guide 54 on the upright 55 and a lens 33 is clamped between the lens pads 29 and 32. The abrading wheel 15 has a groove 58 therein at a distance from the wheel's axis substantially equal to the radius of the base curve of the lens 33 to be abraded. Thus, after inserting a lens 33 between the pads 29 and 32, the member 24 is swung downwardly to position the lens 33 within the groove 58. At this time the screw adjustment 20 may be manipulated to position the edge of the lens 33 in the groove 58 so that the apex of the bevel to be formed on said edge will be located as desired with respect to the side surfaces of the lens. That is, the apex of the bevel can be formed centrally of the lens edge or nearer the front or rear side surface thereof as desired. Then, upon causing rotation of the abrading wheel 15, the edge of the rotating lens in engagement with the groove will be abraded to a depth controlled by the pattern 53. When the edge portion being abraded has been cut away to such an extent that the member 24 has dropped under gravitational force to a point where the pattern 53 continuously engages the guide 54, the edging operation is then completed.

It is to be understood that the means for rotating the lens, may be any one of many known types, that is, the lens may be either continuously or intermittently rotated until its entire contour edge has been shaped.

Figure 4:
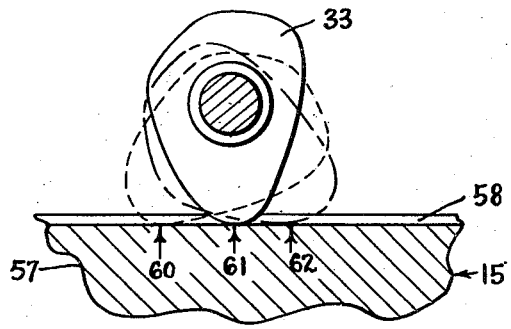
Fig. 4 is a diagrammatic illustration of a lens having an irregular contour edge showing the engagement of said edge with the groove of the grinding element at various times during the rotation thereof and illustrating the so-called reach of the lens during the edging thereof.

It is important to note that in the present construction when a straight or elongated edge portion of a lens 33 is presented to the groove 58, as illustrated in Fig. 4, it will be provided with a bevel throughout said portion consistent with the bevel throughout the remainder of the edge. This is due to the fact that the groove 58 is formed on a radius substantially the same as the base curve of the lens and is curved in the direction of curvature of the lens whereby the elongated edge portion will follow the groove throughout its entire length and will properly engage the groove at all times during its rotation, as indicated in Fig. 4, wherein it will be seen that the lens 33 will be properly abraded whether contacting the groove at the point indicated by numeral 60 or at points 61 and 62. The distance between the points indicated by the numerals 60 and 62 is known in the art as the reach of the lens which takes place during the edging thereof, and with the present construction the so-called error introduced by this reach of the lens, as existed in the past, has been eliminated.

The bevel, when produced in accordance with the foregoing description, will be continuous throughout the entire peripheral edge of the lens and the apex thereof will be substantially smooth and even so as to properly receive a rim member therearound without the necessity of reshaping or otherwise irregularly disposing the rim member about the lens.

From the foregoing, it will be seen that novel means and method of a simple, efficient and economical nature have been provided for forming bevel edges on articles such as ophthalmic lenses in accordance with the objects and advantages of this invention.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

I claim:

1. The method of bevel edging meniscus shaped articles such as lenses and the like to a non-circular contour shape comprising supporting the article in edgewise engagement with a rotating V-grooved abrading surface having the form of an annulus and facing in a direction angled with respect to the axis about which said surface rotates so that the concave side of the article faces the said axis about which said surface rotates, and rotating said article about a second axis extending through its geometrical center and intersecting said axis about which said abrading surface rotates while simultaneously swinging the article about a third axis intersecting the intersection of the said axes about which the abrading surface and article rotate in amounts controlled according to the contour shape desired for said article, the distance of said abrading surface from its axis, and the distance of the article from said third axis being controlled in accordance with the location at which said third axis intersects the axis about which the abrading surface rotates to cause the abrading surface in its rotation to follow the curvature of the article being edged.

2. The method of bevel edging meniscus shaped articles such as lenses and the like to a non-circular contour shape comprising supporting the article in edgewise engagement with a rotating V-grooved abrading surface having the form of an annulus and facing in a direction angled with respect to the axis about which said surface rotates so that the concave side of the article faces the said axis about which said surface rotates, and rotating said article about a second axis extending through its geometrical center and intersecting said axis about which said abrading surface rotates at the plane defined by the apex of said V-shaped abrading groove while simultaneously swinging the article about a third axis intersecting the intersection of the said axes about which the abrading surface and article rotate in amounts controlled according to the contour shape desired for said article, the distance of said abrading surface from its axis, and the article from the third axis, being controlled to approach in value the radius of the curvature of the article being edged.

3. In a device of the character described for forming beveled edges on concavo-convex lenses, the combination of a base, a bowl shaped abrading element rotatable on said base about a first axis and having a V-shaped groove formed in its rim portion encircling the axis thereof and facing in a direction angled with respect to the plane through which the element rotates, a head pivotally mounted on said base in overlying relation to said abrading element and free to move about a second axis substantially intersecting the axis of rotation of the abrading element and substantially in the plane defined by the base of said groove, clamping means rotatably carried by said head for engaging the opposed side surfaces of a lens at a distance from said second axis substantially the same as the radius of the groove of the abrading element whereby a lens having a radius of curvature approaching that of the groove when held thereby may be positioned in edgewise engagement with said groove and its concave surface directed toward said second axis, so that the curved shape of the lens substantially follows the arc defined by the V-shaped groove at the location of engagement of said groove with the edge of the lens, said clamping means being rotatably mounted on said head for movement about an axis approximately cutting the intersection of the axis of said head and abrading element, and driving means for synchronously rotating said clamping means and lens when held thereby.

4. In a device of the character described for bevel edging articles of known general meniscus shape to desired non-circular contour shapes, the combination of a base, axially rotatable abrading means disposed on said base having a groove in its effective surface surrounding said axis in the form of a circle and facing in a direction disposed normal to the plane in which the abrading means is rotatable, a support carried by said base, and holding means mounted on the support for rotation about an axis substantially intersecting the axis of the abrading means, said holding means being located in substantial alignment with a portion of said groove whereby an article may be supported for axial rotation while in edgewise engagement with said groove and its concave side facing the axis of the abrading means to permit its entire peripheral edge to be presented to the rotating groove, a former mounted on said support and adapted for simultaneous rotation with and about the axis of rotation of the holding means, a contact carried by the base and adapted to be engaged by said former as it is rotated, said former having the desired contour shape to be formed on the articles to be edged, and said support being mounted on the base and free to rotate about an axis spaced from the holding means equal to at least the radius of the circle formed by the groove of the abrading means and angularly disposed to the axis of said abrading means, said axis about which the support is free to rotate being located substantially at said axis of the abrading means and in a plane defined by the base of the abrading groove, said rotation of the support being in response to changes in the radial distance of said former from its axis of rotation to said contact whereby an article having a radius of curvature approaching that of the circle formed by said groove in the abrading means will have its edge at different locations of engagement with said groove during rotation of the article and the abrading means substantially along the line of the arc of the curvature of said groove.

5. In a device of the character described for bevel edging articles of known general meniscus shape to desired non-circular contour shapes, the combination of a base, axially rotatable abrading means supported thereby and having a V-shaped groove in its effective surface surrounding said axis in the form of a circle said groove facing in a direction angularly related to the plane in which the abrading means is rotatable, a support on said base, and holding means mounted on the support for rotation about an axis substantially intersecting the axis of the abrading means, said holding means being located on said support in substantial alignment with a portion of said groove whereby an article may be supported for axial rotation while in edgewise engagement with said groove and its concave side facing the axis of the abrading tool to permit its entire peripheral edge to be presented to the rotating groove, said support being mounted on the base to move about an axis spaced from the holding means equal to at least the radius of the groove of the abrading means and intersecting the axis of said abrading means substantially at a plane defined by the base of said groove in the abrading means whereby an article having a radius of curvature approaching that of the circle formed by the V-shaped abrading surface will have its edge at different locations of engagement with said groove during rotation of the abrading means and of the article substantially along the line of the arc of curvature formed by said groove.

6. In a device of the character described for bevel edging articles of known general meniscus shape to desired non-circular contour shapes, the combination of a base, axially rotatable abrading means supported thereby and having a groove in its effective surface surrounding said axis in the form of a circle said groove facing in a direction angularly related to the plane in which the abrading means is rotatable, a support on said base, and holding means mounted on the support for rotation about an axis substantially intersecting the axis of the abrading means, said holding means being located on said support in substantial alignment with a portion of said groove whereby an article may be supported for axial rotation while in edgewise engagement with said groove and its concave side facing the axis of the abrading means to permit its entire peripheral edge to be presented to the rotating groove, a former mounted on said support and rotating simultaneously with and about the axis of rotation of the holding means, a contact carried by said base and located to be engaged by said former as it is rotated, said former having the desired contour shape to be formed on the articles to be edged, and said support being mounted on said base and free to rotate about an axis spaced from the holding means equal to at least the radius of the groove of the abrading means and intersecting the axis of said abrading means, in the plane defined by the base of said groove, whereby an article having a radius of curvature approaching that of the circle formed by the abrading groove will have its edge at different locations of engagement with said groove during rotation of the article substantially along the line of the arc of the circle formed by said groove.

7. In a device of the character described for edging articles of known general meniscus shape to desired non-circular contour shapes, the combination of a base, axially rotatable abrading means supported thereby and having an effective abrading surface surrounding said axis in the form of a circle, said surface facing in a direction angularly related to the plane in which the abrading means is rotatable, a support connected to said base, and holding means mounted on the support for rotation about an axis substantially intersecting the axis of the abrading means, said holding means being located on said support in substantial alignment with a portion of said effective abrading surface whereby an article may be supported for axial rotation while in edgewise engagement with said abrading surface and with its concave side facing the axis of the abrading means to permit its entire peripheral edge to be presented to the rotating surface, a former mounted on said support and rotating simultaneously with the rotation of the holding means, a contact carried by said base and located to be engaged by said former as it is rotated, said former having the desired contour shape to be formed on the articles to be edged, and said support being free to rotate on its connection with said base about an axis spaced from the holding means, said axis about which the support rotates being disposed at the axis of said abrading means in angular relation thereto and in a location so related to the plane defined by the abrading surface and to the separation of the holding means from the axis about which the work support rotates that an article having a radius of curvature approaching that of the circle formed by the abrading surface will have its edge at different locations of engagement with said surface during rotation of the article substantially along the line of the arc of the circle formed by said abrading surface.

8. In a device of the character described for edging articles of known general meniscus shape to desired non-circular contour shapes, the combination of a base, axially rotatable abrading means supported thereby and having a V-shaped abrading groove surrounding said axis in the form of a circle, said groove facing in a direction angularly related to the plane in which the abrading means is rotatable, a support connected to said base, and holding means mounted on the support for rotation about an axis substantially intersecting the axis of the abrading means, said holding means being located on said support in substantial alignment with a portion of said abrading groove whereby an article may be supported for axial rotation while in edgewise engagement with said abrading groove and with its concave side facing the axis of the abrading means to permit its entire peripheral edge to be presented to the rotating groove, a former mounted on said support and rotating simultaneously with the rotation of the holding means, a contact carried by said base and located to be engaged by said former as it is rotated, said former having the desired contour shape to be formed on the articles to be edged, and said support being free to rotate on its connection with said base about an axis spaced from the holding means, said axis about which the support rotates being disposed at the axis of said abrading means in angular relation thereto and in a location so related to the plane defined by the base of the abrading groove and to the separation of the holding means from the axis about which the work support rotates that an article having a radius of curvature approaching that of the circle formed by the abrading groove will have its edge at different locations of engagement with said groove during rotation of the article substantially along the line of the arc of the circle formed by said abrading groove.

9. In the method of bevel edging convexo-concave lenses of non-circular contour wherein lenses are rotated about a predetermined axis to bring successive edge portions thereof into abrading contact with the grooved portion of an axially rotating wheel and are simultaneously moved toward and away from said groove in accordance with radial dimensional changes in said lenses as they are rotated, the improvement comprising angling the axis about which the groove rotates so that it intersects the axis about which the lenses rotate on the concave side of said lenses, disposing the groove so that it faces in a direction angled to the plane in which it rotates, and controlling the location at which said axes intersect and the direction in which the groove faces in the area adjacent its contact with the edge of said lenses so that each portion of the groove as it comes into said area to contact the peripheral edge of the lenses will follow an arcuate path which approaches the concave shape of the lenses whereby, regardless of said radial dimensional changes which cause the edge of said lenses to engage the groove at different spaced points longitudinally of the groove, said edge at said points will assume substantially the same positional relation with the groove and will thereby substantially obviate the "error of reach."

References Cited in the file of this patent

UNITED STATES PATENTS

| Number | Name | Date |
|---|---|---|
| 546,025 | McKim et al. | Sept. 10, 1895 |
| 1,169,460 | Carpenter | Jan. 25, 1916 |
| 1,370,991 | Okey | Mar. 8, 1921 |
| 1,490,115 | Leon | Apr. 15, 1924 |
| 1,619,358 | Maynard | Mar. 1, 1927 |
| 1,832,190 | Doane | Nov. 17, 1931 |
| 2,329,713 | Goddu | Sept. 21, 1943 |
| 2,333,064 | Williams et al. | Oct. 26, 1943 |
| 2,392,478 | Holman | Jan. 8, 1946 |
| 2,451,137 | White | Oct. 12, 1948 |

FOREIGN PATENTS

| Number | Country | Date |
|---|---|---|
| 455,664 | Germany | Feb. 6, 1928 |